April 14, 1970 G. HÄRTEL 3,505,983
MULTI-CYLINDER INTERNAL COMBUSTION ENGINE
Filed Oct. 3, 1967 3 Sheets-Sheet 1

April 14, 1970        G. HÄRTEL        3,505,983

MULTI-CYLINDER INTERNAL COMBUSTION ENGINE

Filed Oct. 3, 1967        3 Sheets-Sheet 2

United States Patent Office 3,505,983
Patented Apr. 14, 1970

3,505,983
MULTI-CYLINDER INTERNAL COMBUSTION ENGINE
Günter Härtel, Braunschweig, Germany, assignor to Deutsche Vergaser Gesellschaft m.b.H. & Co. KG., Neuss am Rhine, Germany
Filed Oct. 3, 1967, Ser. No. 672,555
Claims priority, application Germany, Oct. 5, 1966, D 51,242; June 9, 1967, D 53,303
Int. Cl. F01l 3/00; F02b 75/18
U.S. Cl. 123—52                        6 Claims

ABSTRACT OF THE DISCLOSURE

A multi-cylinder internal combustion engine which operates on an Otto cycle has one or more carburettors or fuel injection pumps connected to its cylinders by an induction system which has at least two induction pipes or other induction ducts which are interconnected by a bypass connection which is connected at one end to a point near a first-aspirator cylinder and at its other end to a point near a second-aspirator cylinder in order to make more uniform the fuel and air mixture which enters the cylinders and prevents this being enriched by fuel deposited on the walls of the induction pipe or other duct leading to any particular cylinder during the time that cylinder is performing strokes other than an induction stroke and the fuel and air mixture in it is stagnant.

---

This invention relates to induction systems for multi-cylinder internal combustion engines, which operate on an Otto cycle and have one or more carburettors or fuel injection pumps for charging the cylinders. The system is arranged to be interposed between one or more carburettors or injection pumps and the cylinders of such an engine. An induction system of this kind may comprise an inlet manifold which forks into branches and contains a throttle valve, or alternatively it may comprise several inlet pipes containing several throttle valves.

In the customary in-line engines the firing order does not follow the sequence of the cylinders. A customary four-cylinder, in-line engine, for example, has the firing order 1–3–4–2. In this case the neighboring cylinders 2 and 1 first of all aspirate one after the other in this order, and then the other two neighboring cylinders 3 and 4 aspirate one after the other in this order.

If the two cylinders of each pair aspirate from a common induction pipe, that is to say if cylinders 2 and 1 aspirate from one induction pipe and the cylinders 3 and 4 aspirate from a second induction pipe, then in each induction pipe the rhythm of aspiration is irregular. For example in the induction pipe serving the cylinders 2 and 1, if the cylinder 2 begins to aspirate when the crankshaft angle is 0°, a new induction stroke begins after the crankshaft has rotated through the following angles: 180°–540°–180°–540°. The cylinder 2 therefore begins its induction stroke after the expiry of an induction pause in this induction pipe which has lasted through 540° of crankshaft rotation. Consider for example an induction system in which there are two carburettors each having a throttle valve and serving through a forked manifold two neighbouring cylinders which form a suction pair, that is to say they aspirate one immediately after the other. While these two cylinders are aspirating, the induction manifold serving the other two cylinders contains a stagnant mixture. This irregularity in the aspiration sequence results in an uneven distribution of fuel to the cylinders, particularly when the engine is operating at low speed under full load and also when partly loaded, the effect being that the "first-aspirator" cylinder of a pair receives a richer mixture. A particular disadvantage is that the concentration of toxic constituents in the exhaust gases is increased.

The reason why the first-aspirator cylinder receives a richer mixture is as follows. The carburettor itself delivers a fuel-air mixture of constant composition and when the engine is operating at high speed the fuel is finely dispersed, both at full load and at part load, due to the high velocity of the air-stream through the carburettor and the high degree of suction. On the other hand, when the engine is at full load and turning slowly the fuel is not so finely dispersed in the air, due to the lower air velocity through the carburettor. The effect is made worse by the fact that when the throttle butterfly valve is fully open it contributes no increase in the velocity of the flowing mixture. Furthermore the comparatively poor suction prevailing under these circumstances does not provide a rapid evaporation of the fuel, and the residual droplets are deposited on the walls of the induction pipe, forming a skin of liquid fuel which moves towards the cylinder head until the higher temperatures prevailing here cause it to evaporate.

During the aspiration pauses the evaporation of the skin of liquid fuel enriches the stagnant mixture, so that when the first-aspirator cylinder begins to aspirate it draws in an over-rich mixture from the induction pipe, the inlet and the inlet port leading to the inlet valve. A further reason for uneven mixture distribution in multicarburettor engines is that the suction fluctuates periodically when the engine is operating at part-load, that is to say the pressure in the inlet manifold or pipe and in the inlet port leading to the inlet valves fluctuates. This again causes deposition of fuel condensate during the aspiration pauses, with the result that when the engine is operating at slow speed the composition of the fuel-air mixture fluctuates. The effect is particularly marked in an engine in which each cylinder has its own induction pipe containing a throttle valve.

The object of the present invention is to avoid these disadvantages, and in particular to provide an induction system for multi-cylinder Otto-cycle engines capable of feeding a substantially uniform mixture to all the cylinders, unaffected by the aspiration pauses.

To this end, according to this invention, in such a system, at least two induction pipes or other induction ducts which are arranged to communicate with different cylinders are connected together by a bypass connection.

When the system is installed in a multi-cylinder Otto cycle engine, it connects a carburettor or fuel injection pump to the cylinders and the bypass connection is connected at one end to a point near to a first-aspirator cylinder and at its other end to a point near a second-aspirator cylinder.

Thus the invention consists quite generally in that bypass pipes or other ducts are provided connecting induction manifolds, their branches or their inlet ports containing stagnant mixture with those other induction pipes, branches, or ports from which mixture is being drawn. In this way stagnant bodies of mixture do not become enriched undesirably by the evaporation of condensed fuel.

In the case where an induction manifold containing a throttle valve common to all the cylinders forms into two branches, the two branches are connected together by at least one bypass connection. The bypass connection can itself be situated outside the engine and can be connected to the induction manifold branches above the cylinder head of the engine. Alternatively, the bypass connection extends through the walls of the induction pipes or other ducts and has one end near a first-aspirator cylinder and the other end near a second-aspirator cylinder. Moreover, there can be either one or two bypass channels extending through the cylinder head, the two ends of these channels being positioned near the inlet valves of the cylinders as described above.

On the other hand, in the case of a four-cylinder engine in which each pair of cylinders has its own induction manifold and its own throttle valve, each induction manifold branching into two induction pipes, one for each cylinder of the pair, each first-aspirator cylinder is connected by a bypass connection to the induction pipe of the second-aspirator cylinder of the other pair, the bypass connections being connected near the cylinder head. A particularly good distribution of the mixture is obtained by connecting a bypass connection between the induction pipe of each second-aspirator cylinder and both the induction pipes for the other pair of cylinders, this end of the bypass pipe being situated in a separating wall between the two induction pipes. In an engine in which each cylinder has its own induction pipe containing a throttle valve, the firing order being as before 1–3–4–2, a bypass connection connects together the induction pipes of cylinders 1 and 4, and a second bypass connection connects the induction pipes of cylinders 2 and 3. This arrangement can be developed further to give an optimum equalisation of mixture between the individual induction pipes by connecting together, the two bypass pipes by a bridging connections. This arrangement allows all the four cylinders to draw mixture from all parts of the induction system, the aspiration rhythm for all parts being one induction stroke for each 180°-rotation of the engine crankshaft.

The system of bypass connections has the effect that bodies of stagnant mixture which have been made over-rich by evaporation of fuel condensed in the induction manifolds and their branches, and in the inlet ports in the cylinder head are drawn away into a different induction manifold or branch or inlet port. The bypass connections also equalise pressures between the individual inlet ports. A further effect produced by the system of bypass connections is that in addition to the flow of mixture entering an aspirating cylinder directly from the carburettor there is also a second flow of mixture through the system independent of the instantaneous suction in the particular induction manifold, branch or port, which carries with it mixture which would otherwise stagnate. This second stream improves dispersal of the fuel and produces a more uniform mixture, particularly for the first-aspirator cylinders, and helps to reduce fluctuations in the richness of the mixture fed to the individual cylinders. The resulting homogeneous mixture distribution depends in detail on the diameters of the bypass connections and on the positions of the points where they join the manifold or inlet ports. The system promotes quiet running of the engine and also reduces the concentration of toxic substances in the exhaust.

Some examples of induction systems in accordance with the invention are illustrated in the accompanying drawings where the systems are shown connected to cylinder heads of multi-cylinder engines. In the drawings.

Figure 6:
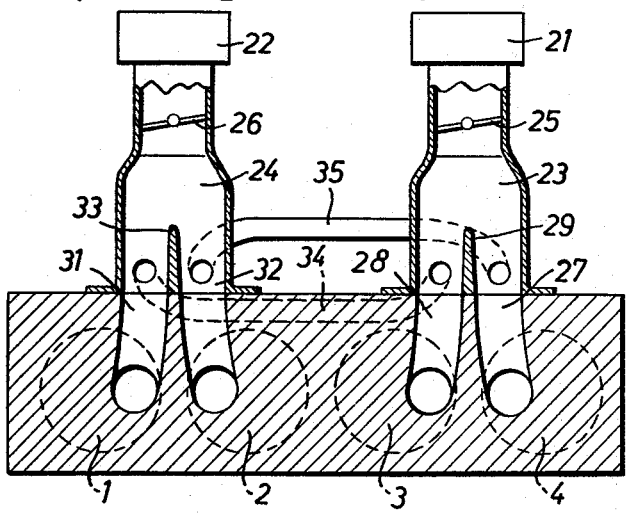
Figure 7:
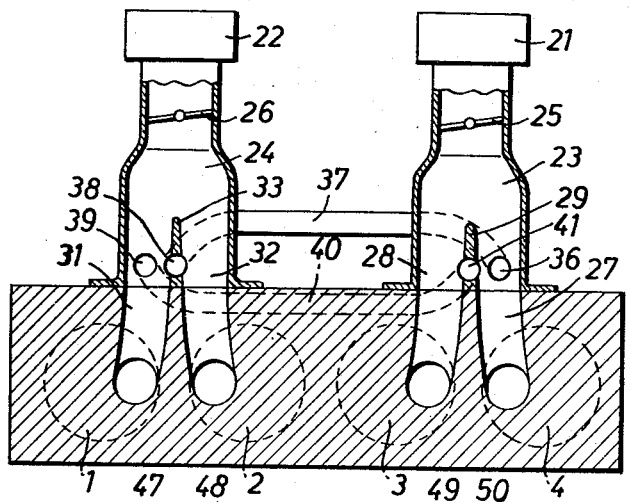
Figure 8:
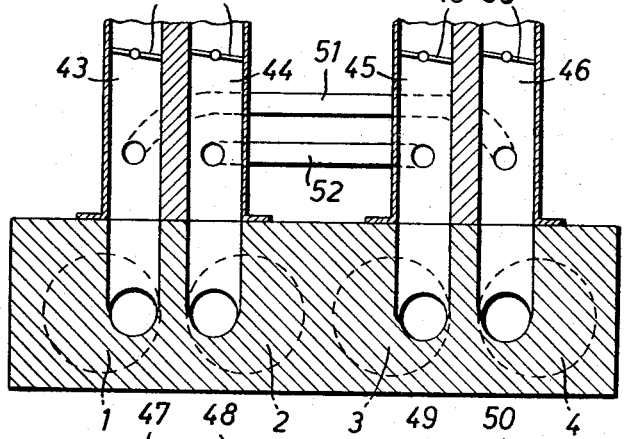
Figure 9:
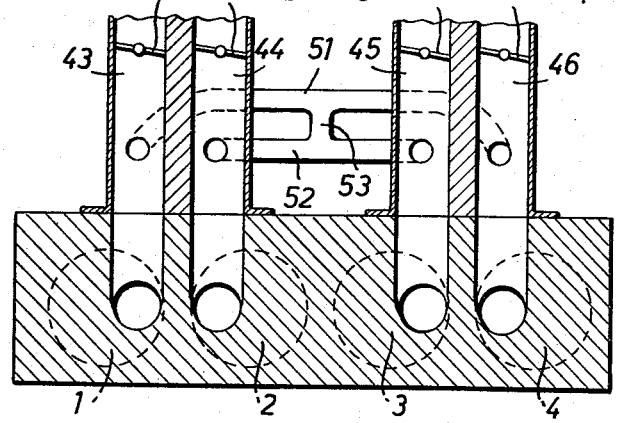

In FIGURES 1 to 5 the carburetor and the throttle butterfly valve have been omitted;

FIGURES 6 and 7 show further examples with a cylinder head in which each neighbouring pair of cylinders has its own carburettor and throttle valve; and FIGURES 8 and 9 show further examples with a cylinder head in which each individual cylinder has its own butterfly throttle valve.

Figure 1:
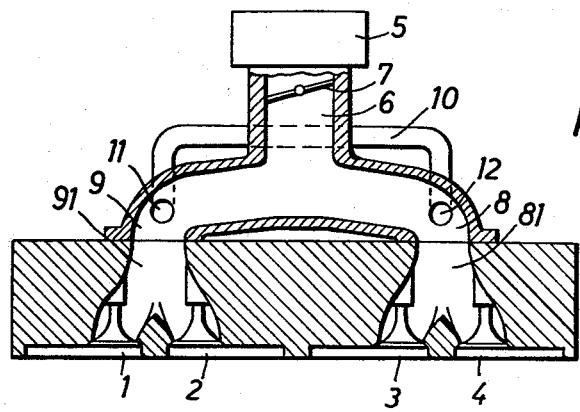
FIGURES 1 and 2 are sections through the cylinder head of a four-stroke in-line engine showing two examples.

All the cylinder heads shown in the drawings are for engines which have the same firing order 1–3–4–2. In FIGURE 1 the two pairs of cylinders 1, 2 and 3, 4 are fed with fuel and air mixture by a carburettor 5 through an inlet manifold 6 containing a butterfly throttle valve 7. The manifold 6 has two branches 8 and 9 which are connected by flanges to the cylinder head and feed mixture through two inlet ports 81 and 91 to two pairs of cylinders 1, 2 and 3, 4. The firing order 1–3–4–2 has the consequence that during the induction stroke of the cylinder 2, and during the immediately following induction stroke of the cylinder 1, the mixture in the branch 8 and in the port 81 remains stagnant and becomes enriched by evaporation of the film of liquid fuel lining the walls of the channels in this region. In order to prevent this enriched mixture from subsequently entering the cylinder 3, which will be first to suck in mixture of the two cylinders 3 and 4, the inlet branches 8 and 9 are joined together by a bypass pipe 10, whose two ends 11 and 12 are connected to the two branches 8 and 9 at points outside the cylinder head. The presence of this bypass has the effect that during the induction stroke of the cylinder 2, which is the first or earlier to aspirate of the two cylinders 2 and 1, this cylinder 2 not only draws in mixture from the carburettor 5 through the manifold 6, through the induction branch 9 and through the inlet port 91, but also sucks in enriched mixture from the suction branch 8 and the port 81 through the bypass pipe 10.

This does not means that the cylinder 2 in this way becomes filled with an excessively rich mixture, because the over-rich mixture which had previously begun to accumulate in the branch 9 and in the port 91, was sucked away through the bypass pipe 10 by the cylinder 4. The cylinder 2 therefore receives a comparatively weak mixture compared with that in an engine equipped with an induction system of the usual kind. The cylinder 2 also receives, through the bypass pipe 10, a comparatively weak mixture from the branch 8 which directly feeds the cylinders 3 and 4. This mixture is comparatively weak because at the beginning of the stagnant pause which occurs here after the cylinder 4 has completed its induction stroke the mixture has not yet had time to take up extra fuel by evaporation of condensate from the walls of the ports. The mixture in the induction branch 8 becomes enriched only gradually by evaporation of liquid fuel from the walls of the port, and during this process of enrichment the mixture here, that is to say in the branch 8, is sucked over through the bypass 10 into the cylinders 2 and 1, and of these two cylinders the cylinder 1, which is the second or later to aspirate, receives the richest mixture through the bypass 10. This process of removing mixture from the branch 8 through the bypass 10 at the same time weakens the mixture which would subsequently be aspirated by the cylinder 3.

What is obtained in this way is that the cylinders 2 and 1, during their induction strokes, clear mixture out of the induction branch 8 and out of the induction port 81, to a degree which depends on the exact location of the connection point 12. The same process takes place in the other direction during the induction strokes of cylinders 3 and 4, that is to say mixture present in the suction branch 9 and in the suction channel 91 is drawn across through the bypass pipe 10 and mingles with the mixture deriving from the carburettor 5 and passing along the induction manifold 6, the branch 8 and the port 81 first into the cylinder 3 and then, during the next induction stroke, into the cylinder 4. It should be observed however that the induction stroke of cylinder 3 begins just after the cylinder 1 has completed its induction stroke, and consequently only a little condensed fuel has had time to evaporate from the walls of the branch 8 and port 81 before cylinder 3 begins its induction stroke. The mixture aspirated by cylinder 3 is therefore not over-rich.

Figure 2:
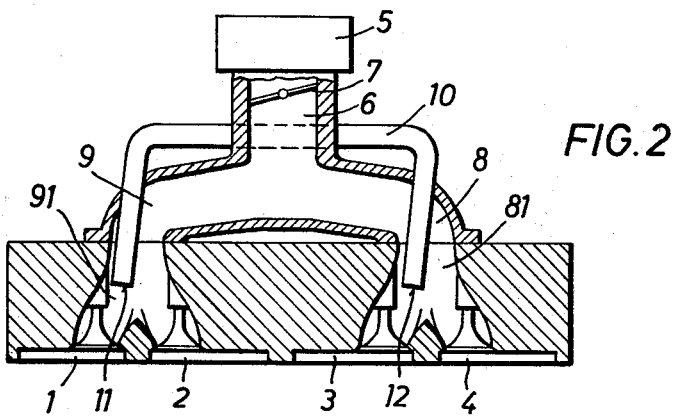

In the example shown in FIGURE 2 the bypass pipe 10 extends through the walls of the branches 8 and 9 and projects inwards as far as the points 11 and 12 situated quite near the inlet valves of the cylinders 1 and 3. Of these two cylinders, the cylinder 3 is the first of the pair 3 and 4 to aspirate, whereas the cylinder 1 is the second of the pair 1 and 2 to aspirate. The effect of this arrangement is that the richer mixture produced in the branch 8 and the channel 81 by evaporation of condensed fuel from the walls is taken mainly by the cylinder 1, which is a "second aspirator." Similarly the cylinders 2 and 4 can of course also be connected by a bypass.

Figure 3:
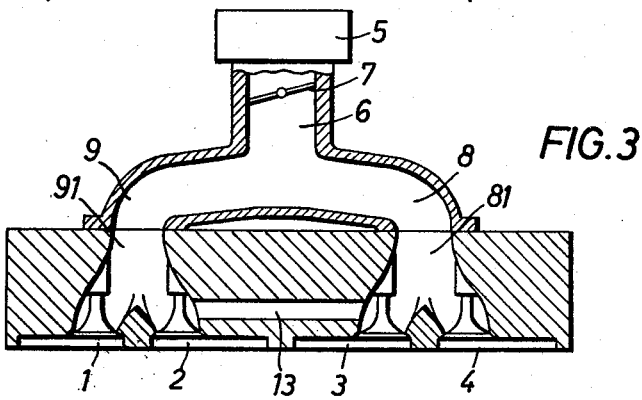
FIGURE 3 is a section similar to FIGURES 1 and 2, but showing a third example.
Figure 4:
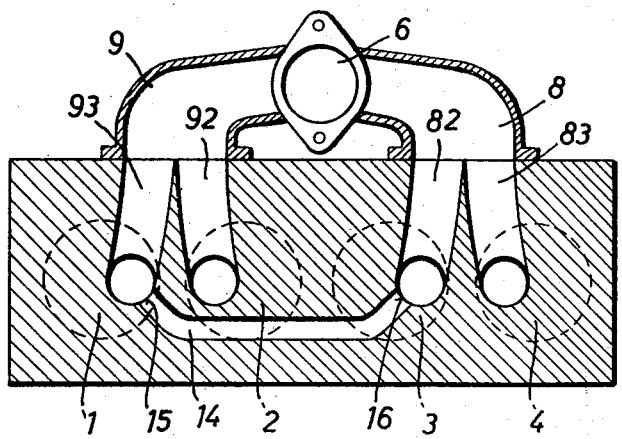
FIGURES 4 and 5 represent a cylinder head equipped with a forked inlet manifold and with separate inlet ports.

In the example shown in FIGURE 3 there is a bypass duct 13 which penetrates through the cylinder head. This arrangement has the particular advantage that the compensating effect is greater because the bypass is short. On the other hand this arrangement merely connect together the inlet ports 81 and 91. In order to provide a bypass connection between a first-aspirator cylinder and a second-aspirator cylinder the arrangement shown in FIGURE 4 can be use. In this case the cylinder head has separate inlet ports 82, 83 and 92, 93. The internal bypass 14 connects the inlet port 82, at a point 16 near the inlet valve of cylinder 3, to the inlet port 93 at a point 15 near the inlet valve of cylinder 1. This direct connection between points near the two inlet valves is analagous to the arrangement shown in FIGURE 2.

Figure 5:
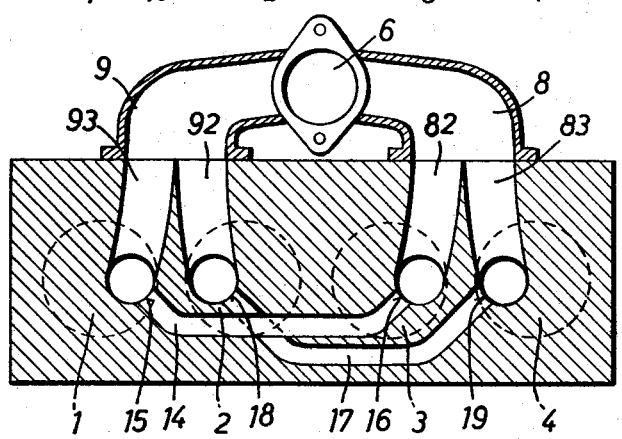

In the arrangement shown in FIGURE 5 there is also a bypass connection 17 extending between points 18 and 19 near the inlet valves of cylinders 2 and 4 (the inlet valves themselves are not shown in these figures). These two bypass ducts between them connect the two cylinders 2 and 3, which would otherwise aspirate over-rich mixtures, to the cylinders 1 and 4, which would otherwise aspirate weak mixtures, in such a way that a full compensation of mixtures is obtained.

Referring now to the example shown in FIGURE 6, the cylinder pairs 1, 2 and 3, 4 receive mixture from two carburetors 21 and 22 through two induction manifolds 23 and 24, each of which contains a throttle valve 25, 26. Each induction manifold 23, 24 forks into two induction ports 27, 28 and 31, 32, each of which leads to a cylinder. Between the ports 27 and 28 there is a separating wall 29, and between the ports 31 and 32 a separating wall 33. In order to prevent the occurrence of stagnant mixtures in the ports 27, 28 and 31, 32 and thus to prevent undesired enrichment of the mixture, the port 28 is connected by a bypass pipe 34 to the port 31, and the port 32 is similarly connected by a second bypass pipe 35 to the port 27. In this way the first-aspirator cylinder 2 is connected to the second-aspirator cylinder 4, and the first-aspirator cylinder 3 is connected to the second-aspirator cylinder 1. The effect of this arrangement is that during the periods when the cylinders 3 and 4 are aspirating, that is to say when there is an aspiration pause in the ports leading to cylinders 1 and 2, mixture passing over the throttle valve 26, together with condensed fuel evaporating in the induction manifold 24, is aspirated through the two bypass pipes 34, 35 into the cylinders 3 and 4. In this way an undesired enrichment of the mixture, and also an undesired pressure increase, in the induction manifold 24 and in the induction ports 31, 32 are prevented.

In the example shown in FIGURE 7 on the other hand, a bypass pipe 37 connects a point 36 in the inlet port 27 of the second-aspirator cylinder 4 to a point 38 situated in the separating wall 33, and similarly a bypass pipe 40 connects a point 39 in the port 31 of the second-aspirator cylinder 1 to a point 41 in the separating wall 29, the points 38, 41 being each connected to two ports 31, 32 and 27, 28.

In the example shown in FIGURE 8 each cylinder has its own induction pipe 43, 44 and 45, 46 each containing a throttle valve 47, 48 and 49, 50. The cylinders can if desired be connected in pairs to two carburetors (not shown) or alternatively each can have its own carburetor. In this case, in contrast to the example of FIGURE 6, there is a bypass pipe 51 between the induction pipe 46 of the cylinder 4 and the suction pipe 43 of the cylinder 1, and a second bypass pipe 52 connecting the induction pipe 45 of the cylinder 3 to the induction pipe 44 of the cylinder 2. As the firing order is 1–3–4–2 each bypass pipe connects together two cylinders whose piston work at the same crankshaft angle. Each cylinder has an aspiration pause lasting through 540° of crankshaft rotation, and consequently the mixture in each induction pipe remains stagnant for a longer period than that which prevails in the examples of FIGURES 6 and 7. Nevertheless owing to the arrangement of bypass pipes a full compensation takes place between the mixtures in the individual induction pipes.

A further improvement in the compensation of mixture and pressure can be obtained as shown in FIGURE 9. Here the two bypass pipes 51 and 52 are connected together by a bridging connection 53, so that during each 180°-rotation of the crankshaft one of the cylinders is drawing mixture through the bypass pipes 51, 52, 53. During each induction stroke, mixture is drawn in this way out of the three induction pipes which would otherwise contain staganant mixture. For example, when the cylinder 1 is aspirating mixture is drawn from the induction pipes 44, 45 and 46, and similarly during aspiration by the cylinder 3 mixture is drawn from the suction pipes 43, 44, 46.

Although the examples described above are based on a firing order 1–3–4–2, the induction system in accordance with the invention can of course be applied to engines operating in any firing order, with or without fuel injection pumps. The essence of the invention is that the bypass pipes or channels are connected in such a way that during the aspiration pauses of each cylinder a stagnant body of mixture in the induction pipe of the particular cylinder cannot be formed or in its induction pipe branch or inlet channel, because this space is always connected to a cylinder which is aspirating.

I claim:

1. In a multi-cylinder internal combustion engine operating on an Otto cycle and including a cylinder head for at least two cylinder pairs, each pair including an earlier and a later aspirating cylinder, means for supplying a fuel and air mixture to said cylinder pairs and an induction system connecting said means to said cylinder pairs, said induction system including a pair of passage means, each leading to one of said cylinder pairs, respectively, each of said passage means having a passage portion leading to one of the cylinders of a respective cylinder pair, said pair of passage means being adapted respectively to receive a richer and a poorer fuel and air mixture alternately and at least one equalizing by-pass duct interconnecting said pair of passage means for equalizing the different mixing ratios of fuel and air therein, said equalizing duct having an opening at both ends thereof, both of said openings being located substantially at said cylinder head, one of said openings being in the passage portion leading to an earlier aspirating cylinder of one of said cylinder pairs, and the other of said openings being in the passage portion leading to a later aspirating cylinder of the other of said cylinder pairs.

2. An engine according to claim 1, wherein both end openings of said equalizing by-pass duct are in said cylinder head.

3. An engine according to claim 1, wherein both end openings of said equalizing by-pass duct are in the immediate vicinity of said cylinder head.

4. An engine as claimed in claim 1, comprising a plurality of means defining a plurality of by-pass ducts, one of said by-pass ducts connecting a passage portion leading to each of the said earlier-aspirator cylinders to a passage portion leading to each of said later-aspirator cylinders.

5. An engine as claimed in claim 1 wherein said by-pass duct is located outside of said cylinder head.

6. An engine as claimed in claim 1 wherein said bypass duct extends through said cylinder head.

References Cited

UNITED STATES PATENTS

| | | |
|---|---|---|
| 1,098,626 | 6/1914 | Hidden. |
| 1,982,625 | 12/1934 | Barker. |
| 2,001,669 | 5/1935 | Smith. |
| 2,080,293 | 5/1937 | Whatmough. |
| 2,160,922 | 6/1939 | Sullivan. |
| 2,315,215 | 3/1943 | Maybach. |

FOREIGN PATENTS 1,021,285  11/1952  France.

WENDELL E. BURNS, Primary Examiner

U.S. Cl. X.R.

123—188